(12) United States Patent
Fujioka et al.

(10) Patent No.: US 9,356,318 B2
(45) Date of Patent: May 31, 2016

(54) GEL POLYMER ELECTROLYTE COMPOSITION

(75) Inventors: Junji Fujioka, Kurashiki (JP); Naoki Fujiwara, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 867 days.

(21) Appl. No.: 13/522,376

(22) PCT Filed: Jan. 13, 2011

(86) PCT No.: PCT/JP2011/050383
§ 371 (c)(1),
(2), (4) Date: Jul. 16, 2012

(87) PCT Pub. No.: WO2011/087029
PCT Pub. Date: Jul. 21, 2011

(65) Prior Publication Data
US 2012/0321963 A1 Dec. 20, 2012

(30) Foreign Application Priority Data

Jan. 15, 2010 (JP) ................................ 2010-006857
Sep. 10, 2010 (JP) ................................ 2010-203242

(51) Int. Cl.
| | | |
|---|---|---|
| C08F 18/08 | (2006.01) | |
| C08L 29/14 | (2006.01) | |
| H01M 10/0565 | (2010.01) | |
| C08F 216/38 | (2006.01) | |
| C08F 216/06 | (2006.01) | |
| H01G 11/56 | (2013.01) | |
| C08F 218/08 | (2006.01) | |
| H01M 10/0525 | (2010.01) | |

(52) U.S. Cl.
CPC ......... *H01M 10/0565* (2013.01); *C08F 216/06* (2013.01); *C08F 216/38* (2013.01); *C08F 218/08* (2013.01); *H01G 11/56* (2013.01); *H01M 10/0525* (2013.01); *C08F 2800/10* (2013.01); *H01M 2300/0085* (2013.01); *Y02E 60/122* (2013.01); *Y02E 60/13* (2013.01)

(58) Field of Classification Search
CPC ............. H01G 11/56; H01M 10/0525; H01M 10/0565; C08F 216/06; C08F 218/08; C08F 216/38; C08F 8/12; C08F 8/48; C08F 8/28; C08F 8/30; C08F 16/06
See application file for complete search history.

(56) References Cited

U.S. PATENT DOCUMENTS

| | | |
|---|---|---|
| 2,739,059 A | 3/1956 | Priest et al. |
| 2004/0157078 A1 | 8/2004 | Yoshida |
| 2006/0208388 A1 | 9/2006 | Bredt et al. |
| 2006/0264572 A1 * | 11/2006 | Hashemzadeh et al. ........ 525/61 |
| 2008/0090145 A1 | 4/2008 | Hiwara et al. |
| 2009/0023076 A1 | 1/2009 | Takeda et al. |
| 2009/0203829 A1 * | 8/2009 | Stark ............................ 524/503 |

FOREIGN PATENT DOCUMENTS

| | | | |
|---|---|---|---|
| EP | 1 437 230 A1 | 7/2004 | |
| EP | 1437230 A1 * | 7/2004 | ............... B41M 5/00 |
| JP | 3 43909 | 2/1991 | |
| JP | 3 43910 | 2/1991 | |
| JP | 2000 225768 | 8/2000 | |
| JP | 2001 200126 | 7/2001 | |
| JP | 2002 179800 | 6/2002 | |
| JP | 2002 244242 | 8/2002 | |
| JP | 2002 293825 | 10/2002 | |
| JP | 2003 515465 | 5/2003 | |
| JP | 2005 50808 | 2/2005 | |
| JP | 2006 253085 | 9/2006 | |
| JP | 2006 322002 | 11/2006 | |
| JP | 2008 501046 | 1/2008 | |
| JP | 2008 159496 | 7/2008 | |
| JP | 2009 110950 | 5/2009 | |

OTHER PUBLICATIONS

Saito,Y., et al., "Designing of a Urea-Containing Polymer Gel Electrolyte Based on the Concept of Activation of the Interaction between the Carrier Ion and Polymer," Journal of Physical Chemistry B, vol. 107, pp. 8805-8811, (2003.
International Search Report Issued Apr. 12, 2011 in PCT/JP11/50838 Filed Jan. 13, 2011.
Extended European Search Report issued May 2, 2014 in Patent Application No. 11732899.7.

* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P.

(57) ABSTRACT

An objective of the present invention is to provide a gel polymer electrolyte composition which exhibits excellent electrolyte retaining ability, excellent ion conductivity, higher mechanical strength and excellent shape preservation, which does not require an extra step for crosslinking, and which can provide a secondary battery with excellent cycle properties and a vinyl acetal polymer used for a gel polymer electrolyte composition. There are provided a vinyl acetal polymer for a gel polymer electrolyte composition, wherein the vinyl acetal polymer has a cationic functional group, as well as a gel polymer electrolyte composition comprising the vinyl acetal polymer and an electrolyte solution, wherein a weight ratio of the vinyl acetal polymer to the electrolyte solution is 0.5:99.5 to 9:91.

7 Claims, No Drawings

GEL POLYMER ELECTROLYTE COMPOSITION

TECHNICAL FIELD

The present invention relates to a gel polymer electrolyte composition and a manufacturing process therefor, as well as a vinyl acetal polymer used for a gel polymer electrolyte composition.

BACKGROUND ART

There have recently appeared many electronic devices such as cell phones and mobile computers, for which attempts have been made for size- and weight-reduction. With such a trend, there have been intense attempts to develop a battery, particularly a secondary battery as a portable power source for an electronic device. A lithium ion secondary battery, inter alia, has gathered attention with an expectation that it could achieve a high energy density, and many studies have been made for a thin and foldable, that is, flexible battery.

A lithium ion secondary battery generally has a cathode, an anode and a separator intervening between a cathode and an anode, where the separator is impregnated with an electrolyte solution as an electrolyte. Because an electrolyte solution is a liquid, a lithium ion secondary battery involving an electrolyte solution exhibits excellent ion conductivity, that is, excellent battery performance, but requires a firm casing for enclosing an electrolyte solution and avoiding an accident by impact in order to prevent leakage of liquid or a fire due to short circuit, which imposes a limitation on the shape of a battery, leading to difficulty in making a battery thin and lightweight.

In contrast, there is known a lithium ion secondary battery involving a totally solid state polymer electrolyte (hereinafter, referred to as "all solid polymer electrolyte") in which an electrolyte salt is dissolved in a polymer compound. A lithium ion secondary battery involving an all solid polymer electrolyte does not require a special structure for preventing leak. Furthermore, an all solid polymer electrolyte can be adhered to an electrode, a separator and/or the like, so that battery strength and shape preservation can be improved. It is, therefore, very effective for making a battery thinner and improving battery flexibility. It is also effective for providing a large area battery. However, there is a problem that an ion conductivity of an all solid polymer electrolyte is substantially lower than that of an electrolyte solution.

Meanwhile, there is known a lithium ion secondary battery involving a gelled polymer electrolyte (hereinafter, referred to as "gel polymer electrolyte") in which a polymer compound retains an electrolyte solution. A lithium ion secondary battery involving a gel polymer electrolyte has gathered attention in that because a polymer retains an electrolyte solution in a gel polymer electrolyte, adhesiveness to an active material and an ion conductivity are more excellent in comparison with a lithium ion secondary battery involving an all solid polymer electrolyte and that leakage of liquid is less likely even compared with a lithium ion secondary battery in which without a gel polymer electrolyte, a separator is impregnated with an electrolyte solution. In general, the larger a proportion of an electrolyte solution in a gel polymer electrolyte is, that is, the larger electrolyte retaining ability is, the larger an ion conductivity is.

A variety of substances have been investigated as a polymer compound for a gel polymer electrolyte, including methyl methacrylate polymers, acrylonitrile polymers and copolymers of polyvinylidene fluoride or vinylidene fluoride with hexafluoropropylene, besides ether polymers.

An ether polymer such as polyethylene oxide, polypropylene oxide and a derivative or copolymer thereof contains highly basic ether oxygens which are capable of trapping a lithium ion and which at the same time, are continuously aligned on a polymer chain, inducing efficient hopping transfer of trapped lithium ion and improving ion conductivity. Commercially available linear polyethylene oxide and polypropylene oxide, however, have a low glass-transition point and a low melting point (about 70° C. or lower), which may lead to poor durability and shape preservation at a high temperature. Furthermore, many of these polymers are soluble in a solvent, so that some measure such as introduction of a crosslinked structure is needed for improving a melting point and solvent resistance.

As a polymer compound used for a gel polymer electrolyte, vinyl acetal polymers such as polyvinyl formal and polyvinyl butyral are known. Such a vinyl acetal polymer has oxygen atoms in its structure as described for the above ether polymer.

For example, Patent Reference Nos. 1 to 3 have described a gel polymer electrolyte containing polyvinyl acetal and an electrolyte solution. Furthermore, Patent Reference No. 4 has described investigation for increasing an electrolyte solution by adjusting the number of hydroxyl groups contained in the polyvinyl acetal through chemical modification of hydroxyl groups. Furthermore, Patent Reference Nos. 5 and 6 have described a process for manufacturing a gel polymer electrolyte with excellent charge/discharge properties and shape preservation by crosslinking the acid-modified polyvinyl acetal by current application or crosslinking the polyvinyl acetal using a crosslinking promoter. There is, however, room for further improvement of ion conductivity of the conventional gel polymer electrolyte described above and cycle properties of a secondary battery produced using the gel polymer electrolyte. There is a problem that in crosslinking the acid-modified polyvinyl acetal by current application or crosslinking the polyvinyl acetal using a crosslinking promoter as described above, preparation of materials and the crosslinking step are troublesome and tends to increase a cost.

It is known that during electrophoresis of lithium ions, anions as counter ions are, of course, also electrophoresed in a direction opposite to that of lithium ions and cause an internal resistance of a battery, leading to deterioration in charge/discharge properties. Moving ability (hereinafter, referred to as "mobility") is different between lithium ions and the anions due to difference in interaction between these substances and an electrolyte solution and a polymer compound. Therefore, as a battery repeats discharge and charge, ion bias in the inside of the battery increases, causing concentration polarization and thus deterioration in battery performance.

A polymer compound used for a conventional gel polymer electrolyte contains a moiety capable of interacting with a lithium ion but not a moiety capable of interacting with an anion, that is, an anion has larger mobility. If an anion can be strongly drawn in a polymer, mobility of the anion can be reduced and a degree of dissociation of an electrolyte salt can be improved. The larger a degree of dissociation of an electrolyte salt is, the larger an ion concentration in a gel polymer electrolyte is and the larger ion conductivity is.

There have been, therefore, attempts to improve a transport number of a lithium ion by introducing a polar group capable of trapping an anion into a polymer matrix or introducing an anion itself into a polymer structure for constraining the anion.

For example, Patent Reference No. 7 has described an ion-conductive polymer having a borosiloxane structure and an ionic conductor therewith. Patent Reference No. 7 has described that in this ion-conductive polymer, a Lewis-acidic boron in the borosiloxane structure traps an anion and segment movement of a side-chain oligo ether bond makes a single cation movement easier, improving ion conductivity. The ionic conductor described in Patent Reference No. 7 is, however, essentially an all solid polymer electrolyte free from an electrolyte solution, so that it fails to exhibit a practically acceptable ion conductivity. Furthermore, a boron-containing compound generally has problems in terms of safety.

Non-patent Reference No. 1 has described attempts for developing a polymer having an urea group which is expected to chemically interact with an anion in an electrolyte salt and reducing anion mobility. However, it cannot strongly withdraw an anion in a polymer and an anion still has larger mobility than a lithium ion.

PRIOR ART REFERENCES

Patent References

Patent Reference No. 1: JP 3-43909 A.
Patent Reference No. 2: JP 3-43910 A.
Patent Reference No. 3: JP 2006-253085 A.
Patent Reference No. 4: JP 2001-200126 A.
Patent Reference No. 5: JP 2005-50808 A.
Patent Reference No. 6: JP 2008-159496 A.
Patent Reference No. 7: JP 2002-179800 A.

Non-Patent References

Non-patent Reference No. 1: J. Phys. Chem. B 2003, 107, 8805-8811.

Problem to be Solved by the Invention

An objective of the present invention is to provide a gel polymer electrolyte composition which exhibits excellent electrolyte retaining ability, excellent ion conductivity, higher mechanical strength and excellent shape preservation, which does not require an extra step for crosslinking, and which can provide a secondary battery with excellent cycle properties and a manufacturing process therefor, as well as a vinyl acetal polymer used for a gel polymer electrolyte composition.

Means for Solving Problem

After intense investigation for achieving the above objective, we have found that the above objective can be achieved by forming a gel polymer electrolyte composition using a vinyl acetal polymer containing a cationic functional group and, after further investigation based on this finding, have achieved the present invention.

Specifically, a vinyl acetal polymer of the present invention is used for a gel polymer electrolyte composition, and has a cationic functional group.

The above vinyl acetal polymer is preferably produced by saponifying and then acetalizing a copolymer of a vinyl ester monomer and a polymerizable monomer having a cationic functional group. The compound used for the acetalization herein is preferably at least one selected from the group consisting of an aliphatic aldehyde having 1 to 15 carbon atoms, a hemiacetal compound of an aliphatic aldehyde having 1 to 15 carbon atoms, a full acetal compound of an aliphatic aldehyde having 1 to 15 carbon atoms, an aromatic aldehyde having 7 to 20 carbon atoms, a hemiacetal compound of an aromatic aldehyde having 7 to 20 carbon atoms and a full acetal compound of an aromatic aldehyde having 7 to 20 carbon atoms.

It is also preferable that the above vinyl acetal polymer is produced by acetalizing a vinyl alcohol polymer with at least one selected from the group consisting of an aldehyde having a cationic functional group, a hemiacetal compound of an aldehyde having a cationic functional group, and a full acetal compound of an aldehyde having a cationic functional group.

The cationic functional group is preferably at least one selected from the group consisting of a quaternary ammonium group, an imidazolium group, a pyridinium group, a phosphonium group and a sulfonium group.

A gel polymer electrolyte composition of the present invention contains the above vinyl acetal polymer and an electrolyte solution, and a weight ratio of the vinyl acetal polymer to the electrolyte solution is 0.5:99.5 to 9:91.

Furthermore, a process for producing a gel polymer electrolyte composition of the present invention contains mixing the above vinyl acetal polymer and an electrolyte solution in the ratio of 0.5:99.5 to 9:91.

Advantage of the Invention

According to the present invention, there can be provided a gel polymer electrolyte composition which exhibits excellent electrolyte retaining ability, excellent ion conductivity, higher mechanical strength and excellent shape preservation, which does not require an extra step for crosslinking, and which can provide a secondary battery with excellent cycle properties. According to the present invention, there can be also provided a vinyl acetal polymer useful for producing a gel polymer electrolyte composition.

BEST MODE FOR CARRYING OUT THE INVENTION

A vinyl acetal polymer of the present invention, which is for a gel polymer electrolyte composition, is used for manufacturing a gel polymer electrolyte composition. The vinyl acetal polymer contains a cationic functional group.

A vinyl acetal polymer of the present invention can have a structure where a cationic functional group and a vinyl acetal polymer skeleton are bound only via one or two or more covalent bonds; for example, a polymer compound having a repeating unit containing an acetal-group-containing structural unit (acetal unit) represented by Formula (I). A specific example of such a polymer compound is preferably a polymer compound having a repeating unit containing a structural unit containing an acetal group represented by Formula (I) (acetal unit), a structural unit containing a hydroxyl group represented by Formula (II) (vinyl alcohol unit) and a structural unit containing an ester bond represented by Formula (III) (for example, a structural unit derived from a vinyl ester (vinyl ester unit)). In this polymer compound, the repeating unit can further contain, besides the above structural units, a structural unit containing a chemically-modified hydroxyl group represented by Formula (IV). In this polymer compound, the repeating unit can contain, besides the above structural units, a structural unit derived from a vinyl compound represented by Formula (V). In this polymer compound, at least one of $Q_a$ in a structural unit containing an acetal group represented by Formula (I) (acetal unit), $Q_c$ in a structural unit containing an ester bond represented by Formula (III), $Q_d$ in a structural unit containing a chemically-modified hydroxyl group represented by Formula (IV) and $Q_e$ in a structural unit derived from a vinyl compound represented by Formula (V) can contain a cationic functional group. For example, when this polymer compound does not contain a structural unit containing a chemically-modified hydroxyl group represented by Formula (IV) or a structural unit derived from a vinyl compound represented by Formula (V), either a structural unit containing an acetal group represented by Formula (I) (acetal unit) or a structural unit containing an ester bond represented by Formula (III) or both can contain a cationic functional group.

In the structural unit containing an acetal group represented by Formula (I) (acetal unit), two or more of which the above polymer compound can contain, $Q_a$ can be one or two or more types. In the structural unit containing an ester bond represented by Formula (III), two or more of which the above polymer compound can contain, each of $Q_b$ and $Q_c$ can be one or two or more types. In the structural unit containing a chemically-modified hydroxyl group represented by Formula (IV), two or more of which the above polymer compound can contain, each of $Q_d$ and $Q_f$ can be one or two or more types. In the structural unit derived from a vinyl compound represented by Formula (V), two or more of which the above polymer compound can contain, each of $Q_e$ and $Q_g$ can be one or two or more types.

In the above polymer compound, there are no particular restrictions to the sequence of the repeating units, which can be arranged at random or as a block.

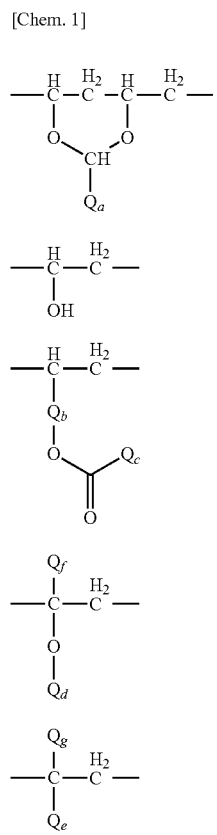

In Formulas (I) to (V), to $Q_a$, $Q_c$ and $Q_e$ is a hydrogen atom, a halogen atom, a substituent having one or more carbon atoms or a cationic functional group. $Q_b$ is a single bond, or a bivalent hydrocarbon chain such as alkylene, alkenylene, alkynylene, phenylene and naphthylene. These bivalent hydrocarbon chains can be substituted with a halogen atom such as fluorine, chlorine and bromine or the like. $Q_d$ is a substituent having one or more carbon atoms or a cationic functional group. $Q_f$ and $Q_g$ are a hydrogen atom or a methyl group. Here, substituents having one or more carbon atoms represented by $Q_a$, $Q_c$, $Q_d$ and $Q_e$ can contain a cationic functional group.

Examples of the above cationic functional group include quaternary ammonium groups (such as a piperidinium group, a piperazinium group and a morpholinium group), imidazolium groups (such as a benzimidazolium group), a pyrazolium group, a pyridinium group, a pyridazinium group, a pyrimidinium group, a pyrazinium group, a triazinium group, a quinolium group, an oxazolinium group (such as a benzoxazolinium group), a isoxazolinium group, thiazolinium groups (such as a benzothiazolinium group), an isothiazolinium group, a phosphonium group and sulfonium groups (such as thiophenium groups (for example, a benzothiophenium group and a dibenzothiophenium group)). A vinyl acetal polymer of the present invention can have one or two or more cationic functional groups. Among these, a preferable cationic functional group is at least one selected from the group consisting of quaternary ammonium groups, imidazolium groups, pyridinium groups, phosphonium groups and sulfonium groups because a starting material is easily available and it allows for easy production of a vinyl acetal polymer of the present invention.

The above quaternary ammonium group can be, for example, that represented by Formula (VI). The above imidazolium group can be, for example, that represented by any of Formulas (VII-a) to (VII-e). The above pyridinium group can be, for example, that represented by any of Formulas (VIII-a) to (VIII-d). The above phosphonium group can be, for example, that represented by Formula (IX). The above sulfonium group can be, for example, that represented by Formula (X).

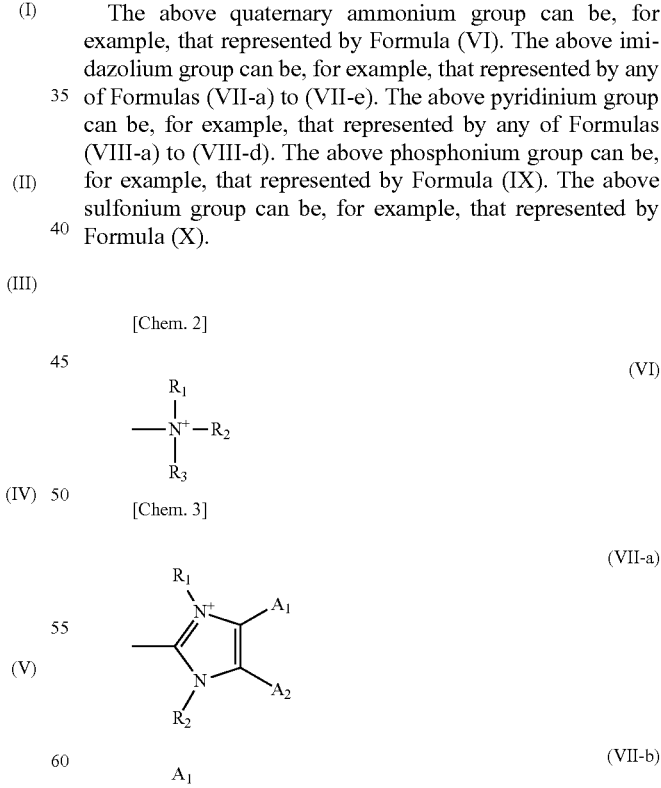

(VII-c) 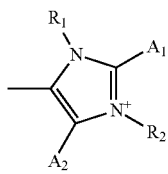

(VII-d) 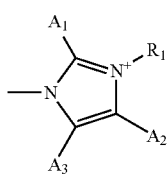

(VII-e) 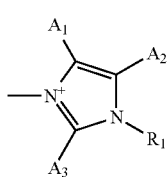

[Chem. 4]

(VIII-a) 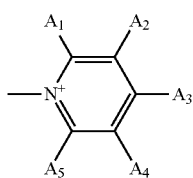

(VIII-b) 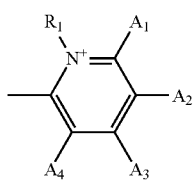

(VIII-c) 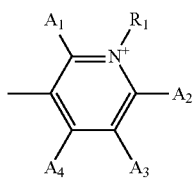

(VIII-d) 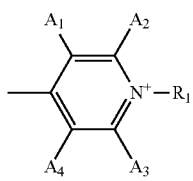

[Chem. 5]

(IX) 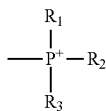

[Chem. 6]

(X) 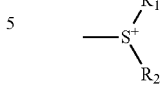

In the above formulas, each of $R_1$, $R_2$ and $R_3$ is a substituent having one or more carbon atoms; and each of $A_1$, $A_2$, $A_3$, $A_4$ and $A_5$ is a hydrogen atom, a halogen atom or a substituent having one or more carbon atoms. Each of these substituents can be completely identical or partially or completely different.

A process for producing a vinyl acetal polymer of the present invention can be, for example, (1) a process containing saponifying and then acetalizing a copolymer produced by copolymerizing a vinyl ester monomer (typically, vinyl acetate) and a polymerizable monomer having a cationic functional group;

(2) a process containing acetalizing a vinyl alcohol polymer with at least one selected from the group consisting of an aldehyde having a cationic functional group, a hemiacetal compound of an aldehyde having a cationic functional group, and a full acetal compound of an aldehyde having a cationic functional group;

(3) a process containing reacting a vinyl alcohol polymer with an alcohol having a cationic functional group or an epoxy compound having a cationic functional group to introduce a cationic functional group via an ether bond and then acetalizing the product;

(4) a process containing reacting a vinyl alcohol polymer with a carboxylic acid having a cationic functional group or a derivative thereof to introduce a cationic functional group via an ester bond and then acetalizing the product;

(5) a process containing reacting a vinyl acetal polymer with an alcohol having a cationic functional group or an epoxy compound having a cationic functional group to introduce a cationic functional group via an ether bond;

(6) a process containing reacting a vinyl acetal polymer with a carboxylic acid having a cationic functional group or a derivative thereof to introduce a cationic functional group via an ester bond, or a combination of two or more of these processes. Among these, processes (1) and (2) are particularly suitably employed.

Examples of the above polymerizable monomer having a cationic functional group used in process (1) include a polymerizable monomer having a quaternary ammonium group, a polymerizable monomer having an imidazolium group, a polymerizable monomer having a pyridinium group, a polymerizable monomer having a phosphonium group and a polymerizable monomer having a sulfonium group.

Examples of the above polymerizable monomer having a quaternary ammonium group include allyltrialkylammoniums such as allyltrimethylammonium, allyltriethylammonium, allylethyldimethylammonium, allyltribenzylammonium and 1-allyl-1-methylpyrrolidinium; diallyldialkylammoniums such as diallyldimethylammonium, diallyldiethylammonium, diallylethylmethylammonium, diallyldibenzylammonium and 1,1-diallylpyrrolidinium; and (meth)acrylamidealkyltrialkylammoniums such as (3-acrylamide-1,3-dimethylbutyl)trimethylammonium, (3-methacrylamide-1,3-dimethylbutyl)trimethylammonium, (3-acrylamidepropyl)trimethylammonium, (3-methacrylamidepropyl)trimethylammonium, (3-acrylamide-3,3-dimethylpropyl)trimethylammonium and (3-methacrylamide-3,3-dimethylpropyl)trimethylammonium.

Examples of the above polymerizable monomer having an imidazolium group include 3-methyl-1-vinylimidazolium, 2,3-dimethyl-1-vinylimidazolium, 2-ethyl-3-methyl-1-vinylimidazolium, 3-methyl-2-phenyl-1-vinylimidazolium and 3-ethyl-1-vinylimidazolium.

Examples of the above polymerizable monomer having a pyridinium group include 1-methyl-2-vinylpyridinium, 1-methyl-3-vinylpyridinium, 1-methyl-4-vinylpyridinium, 1-ethyl-2-vinylpyridinium, 1-ethyl-3-vinylpyridinium and 1-ethyl-4-vinylpyridinium.

Examples of the above polymerizable monomer having a phosphonium group include (3-acrylamidepropyl)trimethylphosphonium, (3-methacrylamidepropyl)trimethylphosphonium, (3-acrylamide-3,3-dimethylpropyl)trimethylphosphonium, trimethyl(2-vinylbenzyl)phosphonium, trimethyl(3-vinylbenzyl)phosphonium, trimethyl(4-vinylbenzyl)phosphonium, tributyl(2-vinylbenzyl)phosphonium, tributyl(3-vinylbenzyl)phosphonium and tributyl(4-vinylbenzyl)phosphonium.

Examples of the above polymerizable monomer having a sulfonium group include dimethyl(2-vinylphenyl)sulfonium, dimethyl(3-vinylphenyl)sulfonium and dimethyl(4-vinylphenyl)sulfonium.

Examples of a counter anion to a cation of the polymerizable monomer having a cationic functional group include, but not limited to, a chloride ion, a bromide ion, an iodide ion, a nitrate ion, a hexafluorophosphate ion, a tetrafluoroborate ion, a hexafluoroarsenate ion, a perchlorate ion, a methanesulfonate ion, a trifluoromethanesulfonate ion, a bis(trifluoromethanesulfonyl)imidate ion, a bis(perfluoroethanesulfonyl)imidate ion, a tris(trifluoromethanesulfonyl)methyl acid ion, tris(perfluoroethanesulfonyl)methyl acid ion, a tetrachloroaluminate ion and a hexafluorosilicate ion.

The above polymerizable monomers having a cationic functional group can be used alone or in combination of two or more. Among these, particularly preferred are diallyldimethylammonium chloride, (3-methacrylamidepropyl)trimethylammonium chloride and (3-acrylamide-3,3-dimethylpropyl)trimethylammonium chloride.

There are no particular restrictions to the conditions under which a vinyl ester monomer is copolymerized with a polymerizable monomer having a cationic functional group in process (1), and the conditions for producing a common vinyl ester polymer can be employed. Furthermore, there are no particular restrictions to the conditions under which a copolymer produced is saponified; for example, the conditions for saponifying a common vinyl ester polymer with an agent such as an alkali, an acid and aqueous ammonia can be employed.

A compound used for acetalization in process (1) is preferably at least one selected from the group consisting of an aliphatic aldehyde having 1 to 15 carbon atoms, a hemiacetal compound of an aliphatic aldehyde having 1 to 15 carbon atoms, a full acetal compound of an aliphatic aldehyde having 1 to 15 carbon atoms, an aromatic aldehyde having 7 to 20 carbon atoms, a hemiacetal compound of an aromatic aldehyde having 7 to 20 carbon atoms and a full acetal compound of an aromatic aldehyde having 7 to 20 carbon atoms.

Among these, examples of an aliphatic aldehyde having 1 to 15 carbon atoms, a hemiacetal compound of an aliphatic aldehyde having 1 to 15 carbon atoms and a full acetal compound of an aliphatic aldehyde having 1 to 15 carbon atoms include formaldehyde, acetaldehyde, propionaldehyde, n-butylaldehyde, n-pentylaldehyde, n-hexylaldehyde, n-heptylaldehyde, 2-ethylhexylaldehyde, cyclohexylaldehyde, furfural, phenylacetaldehyde, β-phenylpropionaldehyde, 2-hydroxy-4-methyltetrahydropyran, glucopyranose, galactopyranose, mannopyranose, arabinopyranose, xylopyranose, ribopyranose, lyxopyranose, allopyranose, altropyranose, gulopyranose, idopyranose, talopyranose, erythrofuranose, threofuranose, arabinofuranose, xylofuranose, ribofuranose, lyxofuranose and n-butylaldehyde dimethylacetal.

Examples of an aromatic aldehyde having 7 to 20 carbon atoms, a hemiacetal compound of an aromatic aldehyde having 7 to 20 carbon atoms and a full acetal compound of an aromatic aldehyde having 7 to 20 carbon atoms include benzaldehyde, 2-methylbenzaldehyde, 3-methylbenzaldehyde, 4-methylbenzaldehyde, p-hydroxybenzaldehyde and m-hydroxybenzaldehyde.

The above compounds used for acetalization can be used alone or in combination of two or more. Among these, formaldehyde, acetaldehyde, n-butylaldehyde and benzaldehyde are preferable, and n-butylaldehyde is particularly preferable.

The conditions of acetalization are based on, for example, an aqueous process wherein an aqueous solution of a polymer to be acetalized (typically, a vinyl alcohol polymer having a cationic functional group) is subjected to acetalization with the above compound used for acetalization (such as an aldehyde) in the presence of an acid catalyst to precipitate a particulate polymer; and a solvent process wherein a polymer to be acetalized is dispersed in an organic solvent and subjected to acetalization with the above compound used for acetalization (such as an aldehyde) in the presence of an acid catalyst and from the reaction solution, a polymer is precipitated with a poor solvent to an acetalized compound obtained (such as water). Of these processes, an aqueous process is preferable. An acid catalyst can be selected from the group consisting of inorganic acids such as hydrochloric acid, nitric acid, sulfuric acid and carbonic acid and organic acids such as acetic acid and propionic acid. Among these, hydrochloric acid and nitric acid are particularly preferable.

A vinyl alcohol polymer used in processes (2), (3) and (4) can be, for example, a compound produced by saponifying a vinyl ester polymer produced by polymerization of a vinyl ester monomer such as vinyl acetate, preferably a polyvinyl alcohol produced by saponifying a homopolymer of vinyl acetate.

Examples of the aldehyde having a cationic functional group, the hemiacetal compound of an aldehyde having a cationic functional group and the full acetal compound of an aldehyde having a cationic functional group used in process (2) include a compound having a quaternary ammonium group, a compound having an imidazolium group, a compound having a pyridinium group, a compound having a phosphonium group and a compound having a sulfonium group.

Examples of the above compound having a quaternary ammonium group include (formylmethyl)trimethylammonium, (1-formylethyl)trimethylammonium, (2-formylethyl)trimethylammonium, (1-formylpropyl)trimethylammonium, (2-formylpropyl)trimethylammonium, (3-formylpropyl)trimethylammonium, (2-formylphenyl)trimethylammonium, (3-formylphenyl)trimethylammonium, (4-formylphenyl)trimethylammonium, (4-formylbenzyl)trimethylammonium, triethyl(formylmethyl)ammonium, triethyl(1-formylethyl)ammonium, triethyl(2-formylethyl) ammonium, triethyl(1-formylpropyl)ammonium, triethyl(2-formylpropyl)ammonium, triethyl(3-formylpropyl)ammonium, triethyl(2-formylphenyl)ammonium, triethyl(3-formylphenyl)ammonium, triethyl(4-formylphenyl)ammonium, 2-hydroxy-4-trimethylammoniotetrahydropyran, 2-hydroxy-4,4-dimethylmorpholin-4-ium, (2,2-diethoxyethyl)

trimethylammonium, [(1,3-dioxan-2-yl)methyl]trimethylammonium, 2-methoxy-4,4-dimethylmorpholin-4-ium, 2-ethoxy-4,4-dimethylmorpholin-4-ium, 4,4-dimethyl-2-propyloxymorpholin-4-ium, 4,4-dimethyl-2-(1-methylethoxy)morpholin-4-ium, 4,4-dimethyl-2-(2,2,2-trifluoroethoxy)morpholin-4-ium, 2-benzyloxy-4,4-dimethylmorpholin-4-ium and 2-ethoxy-4-methyl-4-benzylmorpholin-4-ium.

Examples of the above compound having an imidazolium group include 3-(formylmethyl)-1-methyl-1H-imidazol-3-ium, 3-(1-formylethyl)-1-methyl-1H-imidazol-3-ium, 3-(2-formylethyl)-1-methyl-1H-imidazol-3-ium, 3-(1-formylpropyl)-1-methyl-1H-imidazol-3-ium, 3-(2-formylpropyl)-1-methyl-1H-imidazol-3-ium, 3-(3-formylpropyl)-1-methyl-1H-imidazol-3-ium, 1-ethyl-3-(formylmethyl)-1H-imidazol-3-ium, 1-ethyl-3-(1-formylethyl)-1H-imidazol-3-ium, 1-ethyl-3-(2-formylethyl)-1H-imidazol-3-ium, 1-ethyl-3-(1-formylpropyl)-1H-imidazol-3-ium, 1-ethyl-3-(2-formylpropyl)-1H-imidazol-3-ium, 1-ethyl-3-(3-formylpropyl)-1H-imidazol-3-ium, 3-(formylmethyl)-1,2-dimethyl-1H-imidazol-3-ium, 3-(formylmethyl)-1,4-dimethyl-1H-imidazol-3-ium, 3-(formylmethyl)-1,5-dimethyl-1H-imidazol-3-ium, 3-(formylmethyl)-1,2,4-trimethyl-1H-imidazol-3-ium, 3-(formylmethyl)-1,2,5-trimethyl-1H-imidazol-3-ium, 3-(formylmethyl)-1,2,4,5-tetramethyl-1H-imidazol-3-ium, 1,2-diethyl-3-(formylmethyl)-1H-imidazol-3-ium, 3-(formylmethyl)-1-methyl-1H-benzimidazol-3-ium, 3-(2-formylethyl)-1-methyl-1H-benzimidazol-3-ium, 3-(3-formylpropyl)-1-methyl-1H-benzimidazol-3-ium, 1-ethyl-3-(formylmethyl)-1H-benzimidazol-3-ium, 3-(formylmethyl)-1,2-dimethyl-1H-benzimidazol-3-ium, 1,2-diethyl-3-(formylmethyl)-1H-benzimidazol-3-ium, 2-formyl-1,3-dimethyl-1H-imidazol-3-ium, 2-(formylmethyl)-1,3-dimethyl-1H-imidazol-3-ium, 2-(2-formylethyl)-1,3-dimethyl-1H-imidazol-3-ium, 2-(3-formylpropyl)-1,3-dimethyl-1H-imidazol-3-ium, 1,3-diethyl-2-formyl-1H-imidazol-3-ium, 2-formyl-1,3-dimethyl-1H-benzimidazol-3-ium, 4-formyl-1,3-dimethyl-1H-imidazol-3-ium, 4-(2-formylethyl)-1,3-dimethyl-1H-imidazol-3-ium, 4-(3-formylpropyl)-1,3-dimethyl-1H-imidazol-3-ium, 1,3-diethyl-4-formyl-1H-imidazol-3-ium, 4-formyl-1,3-dimethyl-1H-benzimidazol-3-ium, 2-hydroxy-4-(3-methylimidazolio)tetrahydropyran, 3-(2,2-dimethoxyethyl)-1-methyl-1H-imidazol-3-ium, 1-ethyl-3-(2,2-dimethoxyethyl)-1H-imidazol-3-ium and 3-(2,2-dimethoxyethyl)-1-methyl-1H-benzimidazol-3-ium.

Examples of the above compound having a pyridinium group include 1-methylpyridinium-2-carboaldehyde, 1-methylpyridinium-3-carboaldehyde and 1-methylpyridinium-4-carboaldehyde.

Examples of the above compound having a phosphonium group include (formylmethyl)trimethylphosphonium, triethyl(formylmethyl)phosphonium, triethyl(2-formylethyl)phosphonium, (2-formylethyl)triisopropylphosphonium, tributyl(2-formylethyl)phosphonium, triethyl(3-formylpropyl)phosphonium, (3-formylpropyl)triisopropylphosphonium, tributyl(3-formylpropyl)phosphonium, (formylmethyl)triphenylphosphonium, (2-formylethyl)triphenylphosphonium, (3-formylpropyl)triphenylphosphonium, 2-hydroxy-4-tributylphosphoniotetrahydropyran, tributyl(1,3-dioxolan-2-yl)phosphonium, tributyl(1,3-dioxolan-2-ylmethyl)phosphonium, (1,3-dioxan-2-ylmethyl)triphenylphosphonium and (1,3-dioxolan-2-ylmethyl)triphenylphosphonium.

Examples of the above compound having a sulfonium group include 4-formylphenyldimethylsulfonium, 4-formylphenyldiphenylsulfonium, 2-hydroxy-4-dimethylsulfoniotetrahydropyran, 2,2-dimethoxyethyldimethylsulfonium, 2,2-dimethoxyethyldiphenylsulfonium, 2,2-diethoxyethyldimethylsulfonium and 2,2-diethoxyethyldiphenylsulfonium.

Examples of a counter anion to a cation of the aldehyde having a cationic functional group, the hemiacetal compound of an aldehyde having a cationic functional group and the full acetal compound of an aldehyde having a cationic functional group include, but not limited to, a chloride ion, a bromide ion, an iodide ion, a nitrate ion, a hexafluorophosphate ion, a tetrafluoroborate ion, a hexafluoroarsenate ion, a perchlorate ion, a methanesulfonate ion, a trifluoromethanesulfonate ion, a bis(trifluoromethanesulfonyl)imidate ion, a bis(perfluoroethanesulfonyl)imidate ion, a tris(trifluoromethanesulfonyl)methyl acid ion, tris(perfluoroethanesulfonyl)methyl acid ion, a tetrachloroaluminate ion and a hexafluorosilicate ion.

The aldehyde having a cationic functional group, the hemiacetal compound of an aldehyde having a cationic functional group and the full acetal compound of an aldehyde having a cationic functional group can be used alone or in combination of two or more. Among these, particularly preferred are (formylmethyl)trimethylammonium hexafluorophosphate and 3-(2,2-dimethoxyethyl)-1-methyl-1H-imidazol-3-ium hexafluorophosphate.

In process (2), for regulating a degree of acetalization, a cationic-functional-group content described later and the like within desired ranges, at least one selected from the group consisting of an aldehyde having a cationic functional group, a hemiacetal compound of an aldehyde having a cationic functional group and a full acetal compound of an aldehyde having a cationic functional group is preferably combined with at least one selected from the group consisting of an aldehyde free from a cationic functional group, a hemiacetal compound of an aldehyde free from a cationic functional group and a full acetal compound of an aldehyde free from a cationic functional group. Examples of such a compound can include those compounds described as examples of a compound used for acetalization in process (1).

In process (2), the conditions for acetalization of a vinyl alcohol polymer can be, for example, known conditions employed for producing a polyvinyl butyral by reacting a polyvinyl alcohol with n-butylaldehyde in the presence of an acid catalyst.

Examples of the above alcohols having a cationic functional group and the epoxy compound having a cationic functional group used in process (3) include alcohols having a quaternary ammonium group, alcohols having an imidazolium group, alcohols having a pyridinium group, alcohols having a phosphonium group, alcohols having a sulfonium group, epoxy compounds having a quaternary ammonium group, epoxy compounds having an imidazolium group, epoxy compounds having a pyridinium group, epoxy compounds having a phosphonium group and epoxy compounds having a sulfonium group.

Examples of the above alcohols having a quaternary ammonium group include (2-hydroxyethyl)trimethylammonium, triethyl(2-hydroxyethyl)ammonium, (3-hydroxypropyl)trimethylammonium, triethyl(3-hydroxypropyl)ammonium, (4-hydroxybutyl)trimethylammonium and triethyl(4-hydroxybutyl)ammonium.

Examples of the alcohols having an imidazolium group include 3-(hydroxymethyl)-1-methyl-1H-imidazol-3-ium, 1,2-diethyl-3-(hydroxymethyl)-1H-imidazol-3-ium, 3-(2-hydroxyethyl)-1-methyl-1H-imidazol-3-ium, 3-(3-hydroxypropyl)-1-methyl-1H-imidazol-3-ium, 3-(4-hydroxybutyl)-1-methyl-1H-imidazol-3-ium, 2-(hydroxymethyl)-1,3- dimethyl-1H-imidazol-3-ium, 2-(2-hydroxyethyl)-1,3-dimethyl-1H-imidazol-3-ium, 2-(3-hydroxypropyl)-1,3-dimethyl-1H-imidazol-3-ium, 2-(4-hydroxybutyl)-1,3-dimethyl-1H-imidazol-3-ium, 2-(hydroxymethyl)-1,3,4-trimethyl-1H-imidazol-3-ium, 2-(hydroxymethyl)-1,3,4,5-tetramethyl-1H-imidazol-3-ium, 4-(hydroxymethyl)-1,3-dimethyl-1H-imidazol-3-ium, 4-(2-hydroxyethyl)-1,3-dimethyl-1H-imidazol-3-ium, 4-(3-hydroxypropyl)-1,3-dimethyl-1H-imidazol-3-ium, 4-(4-hydroxybutyl)-1,3-dimethyl-1H-imidazol-3-ium, 4-(hydroxymethyl)-1,2,3-trimethyl-1H-imidazol-3-ium and 4-(hydroxymethyl)-1,2,3,5-tetramethyl-1H-imidazol-3-ium.

Examples of the above alcohols having a pyridinium group include 2-(hydroxymethyl)-1-methylpyridinium, 2-(2-hydroxyethyl)-1-methylpyridinium, 2-(3-hydroxypropyl)-1-methylpyridinium, 2-(4-hydroxybutyl)-1-methylpyridinium, 3-(hydroxymethyl)-1-methylpyridinium, 4-(hydroxymethyl)-1-methylpyridinium and 1-ethyl-3-(hydroxymethyl)pyridinium.

Examples of the above alcohols having a phosphonium group include (hydroxymethyl)trimethylphosphonium, (2-hydroxyethyl)trimethylphosphonium, (3-hydroxypropyl)trimethylphosphonium, (4-hydroxybutyl)trimethylphosphonium, triethyl(hydroxymethyl)phosphonium, (hydroxymethyl)tripropylphosphonium, triisopropyl(hydroxymethyl)phosphonium, tributyl(hydroxymethyl)phosphonium and (hydroxymethyl)triphenylphosphonium.

Examples of the above alcohols having a sulfonium group include (hydroxymethyl)dimethylsulfonium, (2-hydroxyethyl)dimethylsulfonium, (3-hydroxypropyl)dimethylsulfonium, (4-hydroxybutyl)dimethylsulfonium and dibutyl(hydroxymethyl)sulfonium, (hydroxymethyl)diphenylsulfonium.

Examples of the above epoxy compounds having a quaternary ammonium group include glycidyltrimethylammonium, triethylglycidylammonium, glycidyltripropylammonium, glycidyltriisopropylammonium and tributylglycidylammonium.

Examples of the above epoxy compounds having an imidazolium group include 3-glycidyl-1-methyl-1H-imidazol-3-ium, 1,2-diethyl-3-glycidyl-1H-imidazol-3-ium, 2-glycidyl-1,3-dimethyl-1H-imidazol-3-ium, 2-glycidyl-1,3,4-trimethyl-1H-imidazol-3-ium, 2-glycidyl-1,3,4,5-tetramethyl-1H-imidazol-3-ium, 4-glycidyl-1,3-dimethyl-1H-imidazol-3-ium, 4-glycidyl-1,2,3-trimethyl-1H-imidazol-3-ium and 4-glycidyl-1,2,3,5-tetramethyl-1H-imidazol-3-ium.

Examples of the above epoxy compounds having a pyridinium group include 2-glycidyl-1-methylpyridinium, 3-glycidyl-1-methylpyridinium, 4-glycidyl-1-methylpyridinium and 1-ethyl-3-glycidylpyridinium.

Examples of the above epoxy compounds having a phosphonium group include glycidyltrimethylphosphonium, triethylglycidylphosphonium, glycidyltripropylphosphonium, glycidyltriisopropylphosphonium, tributylglycidylphosphonium and glycidyltriphenylphosphonium.

Examples of the above epoxy compounds having a sulfonium group include glycidyldimethylsulfonium, dibutylglycidylsulfonium and glycidyldiphenylsulfonium.

Examples of a counter anion to a cation of the alcohol having a cationic functional group and the epoxy compound having a cationic functional group include, but not limited to, a chloride ion, a bromide ion, an iodide ion, a nitrate ion, a hexafluorophosphate ion, a tetrafluoroborate ion, a hexafluoroarsenate ion, a perchlorate ion, a methanesulfonate ion, a trifluoromethanesulfonate ion, a bis(trifluoromethanesulfonyl)imidate ion, a bis(perfluoroethanesulfonyl)imidate ion, a tris(trifluoromethanesulfonyl)methyl acid ion, tris(perfluoroethanesulfonyl)methyl acid ion, a tetrachloroaluminate ion and a hexafluorosilicate ion.

The above alcohols having a cationic functional group and the epoxy compounds having a cationic functional group can be used alone or in combination of two or more. Among these, particularly preferred are glycidyltrimethylammonium hexafluorophosphate and 3-glycidyl-1-methyl-1H-imidazol-3-ium hexafluorophosphate.

In process (3), the conditions for reacting a vinyl alcohol polymer with the above alcohol having a cationic functional group or the epoxy compound having a cationic functional group can be generally the conditions for treating an alcohol with sulfuric acid to give an ether or reacting an alcohol with an epoxide in the presence of an acid catalyst.

In process (3), examples of a compound used for acetalization of a vinyl alcohol polymer having a cationic functional group produced include the compounds described as examples of a compound used for acetalization in process (1). Some or all of compounds used for this acetalization can be the compounds described above as examples of an aldehyde having a cationic functional group, a hemiacetal compound of an aldehyde having a cationic functional group and a full acetal compound of an aldehyde having a cationic functional group.

The acetalization conditions can be, for example, known conditions employed for reacting a polyvinyl alcohol with n-butylaldehyde in the presence of an acid catalyst to produce a polyvinyl butyral.

Examples of the above carboxylic acid having a cationic functional group and a derivative of the carboxylic acid having a cationic functional group used in process (4) include a compound having a quaternary ammonium group, a compound having an imidazolium group, a compound having a pyridinium group, a compound having a phosphonium group and a compound having a sulfonium group.

Examples of the above compound having a quaternary ammonium group include betaine (glycinebetaine), alaninebetaine, phenylalaninebetaine, leucinebetaine, (2-carboxyphenyl)trimethylammonium, (3-carboxyphenyl)trimethylammonium, (4-carboxyphenyl)trimethylammonium, (2-carboxyphenyl)triethylammonium, (3-carboxyphenyl)triethylammonium and (4-carboxyphenyl)triethylammonium.

Examples of the above compound having an imidazolium group include 3-(carboxymethyl)-1-methyl-1H-imidazol-3-ium, 3-(carboxymethyl)-1,2-diethyl-1H-imidazol-3-ium, 3-(1-carboxyethyl)-1-methyl-1H-imidazol-3-ium and 3-(2-carboxyethyl)-1-methyl-1H-imidazol-3-ium.

Examples of the above compound having a pyridinium group include 2-carboxy-1-methylpyridinium, 3-carboxy-1-methylpyridinium, 4-carboxy-1-methylpyridinium and 3-carboxy-1-ethylpyridinium.

Examples of the above compound having a phosphonium group include trimethylphosphonioacetic acid, tributylphosphonioacetic acid, triphenylphosphonioacetic acid, 2-tributylphosphoniobenzoic acid, 3-tributylphosphoniobenzoic acid and 4-tributylphosphoniobenzoic acid.

Examples of the above compound having a sulfonium group include dimethylsulfonioacetic acid, dibutylsulfonioacetic acid, diphenylsulfonioacetic acid, 2-dibutylsulfoniobenzoic acid, 3-dibutylsulfoniobenzoic acid and 4-dibutylsulfoniobenzoic acid.

Examples of a counter anion to a cation of the carboxylic acid having a cationic functional group and a derivative of the carboxylic acid having a cationic functional group include, but not limited to, a chloride ion, a bromide ion, an iodide ion, a nitrate ion, a hexafluorophosphate ion, a tetrafluoroborate ion, a hexafluoroarsenate ion, a perchlorate ion, a methanesulfonate ion, a trifluoromethanesulfonate ion, a bis(trifluoromethanesulfonyl)imidate ion, a bis(perfluoroethanesulfonyl)imidate ion, a tris(trifluoromethanesulfonyl)methyl acid ion, tris(perfluoroethanesulfonyl)methyl acid ion, a tetrachloroaluminate ion and a hexafluorosilicate ion.

The carboxylic acid having a cationic functional group and the derivative of the carboxylic acid having a cationic functional group can be used alone or in combination of two or more. Among these, particularly preferred are betaine hexafluorophosphate and (4-carboxyphenyl)trimethylammonium hexafluorophosphate.

In process (4), the conditions for reacting a vinyl alcohol polymer with the above carboxylic acid having a cationic functional group and a derivative thereof can be generally the conditions for reacting an alcohol with a carboxylic acid in the presence of an acid or base catalyst to give an ester.

In process (4), examples of a compound used for acetalization of a vinyl alcohol polymer having a cationic functional group produced include the compounds described as examples of a compound used for acetalization in process (1). Some or all of compounds used for this acetalization can be the compounds described above in process (2) as examples of an aldehyde having a cationic functional group, a hemiacetal compound of an aldehyde having a cationic functional group and a full acetal compound of an aldehyde having a cationic functional group.

The acetalization conditions can be, for example, known conditions employed for reacting a polyvinyl alcohol with n-butylaldehyde in the presence of an acid catalyst to produce a polyvinyl butyral.

A vinyl acetal polymer used in processes (5) and (6) is suitably a compound by acetalizing the above vinyl alcohol polymer used in processes (2), (3) and (4).

A compound used for acetalization of a vinyl alcohol polymer can be the compounds described above as examples of a compound used for acetalization in process (1). Some or all of compounds used for this acetalization can be the compounds described above in process (2) as examples of an aldehyde having a cationic functional group, a hemiacetal compound of an aldehyde having a cationic functional group and a full acetal compound of an aldehyde having a cationic functional group.

The acetalization conditions can be, for example, known conditions employed for reacting a polyvinyl alcohol with n-butylaldehyde in the presence of an acid catalyst to produce a polyvinyl butyral.

Examples of the above alcohol having a cationic functional group and the above epoxy compound having a cationic functional group used in process (5) can be the compounds described above as examples of an alcohol having a cationic functional group and an epoxy compound having a cationic functional group used in process (3). Furthermore, the conditions for reacting a vinyl acetal polymer with the above alcohol having a cationic functional group or the epoxy compound having a cationic functional group can be generally the conditions for treating an alcohol with sulfuric acid to give an ether or reacting an alcohol with an epoxide in the presence of an acid catalyst.

Examples of the above carboxylic acid having a cationic functional group and a derivative of the carboxylic acid having a cationic functional group used in process (6) can be the compounds described above as examples of a carboxylic acid having a cationic functional group and a derivative of the carboxylic acid having a cationic functional group used in process (4). Furthermore, the conditions for reacting a vinyl acetal polymer with the above carboxylic acid having a cationic functional group and a derivative thereof can be generally the conditions for reacting an alcohol with a carboxylic acid in the presence of an acid or base catalyst to give an ester.

A polymerization degree of a vinyl alcohol polymer as a starting material of the vinyl alcohol polymer having a cationic functional group produced in process (1), the vinyl alcohol polymer used in process (2), (3) and (4) and the vinyl acetal polymer used in process (5) and (6) is preferably in the range of 100 to 5000, more preferably in the range of 150 to 3500, further preferably in the range of 200 to 2500 as an average polymerization degree as determined in accordance with a method for testing a polyvinyl alcohol as defined in JIS K 6726-1994.

A degree of saponification of a vinyl alcohol polymer as a starting material of the vinyl alcohol polymer having a cationic functional group produced in process (1), the vinyl alcohol polymer used in process (2), (3) and (4) and the vinyl acetal polymer used in process (5) and (6) is preferably 80 mol % or more.

A degree of acetalization of a vinyl acetal polymer of the present invention is preferably in the range of 0.1 to 85 mol %, more preferably in the range of 1 to 83 mol %, further preferably in the range of 10 to 80 mol %. The term "degree of acetalization" as used herein means a proportion of a mole number of a structural unit constituting an acetal unit to the total mole number of a structural unit constituting an acetal unit, a vinyl alcohol unit and vinyl ester unit. Here, since one acetal unit is regarded as formed from two structural units, a mole number of a structural unit constituting an acetal unit is generally twice a mole number of the acetal unit. Specifically, when a vinyl acetal polymer is formed from the above structural unit containing an acetal group represented by Formula (I) (acetal unit): $n_I$ moles, the above structural unit containing a hydroxyl group represented by Formula (II) (vinyl alcohol unit): $n_{II}$ moles and the above structural unit containing an ester bond represented by Formula (III): $n_{III}$ moles, a degree of acetalization can be determined by the following equation.

$$\text{Degree of acetalization(mol \%)} = 100 \times [n_I \times 2]/[n_I \times 2 + n_{II} + n_{III}]$$

Herein, a degree of acetalization is particularly referred to as a "degree of formalization" for an acetal unit corresponding to an acetal of formaldehyde, a "degree of acetoacetalization_" for an acetal unit corresponding to an acetal of acetaldehyde, and a "degree of butyralization" for an acetal unit corresponding to an acetal of butylaldehyde. For example, when a vinyl acetal polymer is formed from the above structural unit containing an acetal group represented by Formula (I) where $Q_a$ is a propyl group (an acetal unit corresponding to an acetal of butylaldehyde): $n_I(Bu)$ moles, the above structural unit containing an acetal group represented by Formula (I) where $Q_a$ is a methyl group (an acetal unit corresponding to an acetal of acetaldehyde): $n_I(Ac)$ moles, the above structural unit containing a hydroxyl group represented by Formula (II) (vinyl alcohol unit): $n_{II}$ moles, and the above structural unit containing an ester bond represented by Formula (III): $n_{III}$ moles, a degree of butyralization and a degree of acetoacetalization can be determined by the following equations.

$$\text{Degree of butyralization(mol \%)} = 100 \times [n_I(Bu) \times 2]/[n_I(Bu) \times 2 + n_I(Ac) \times 2 + n_{II} + n_{III}]$$

$$\text{Degree of acetoacetalization(mol \%)} = 100 \times [n_I(Ac) \times 2]/[n_I(Bu) \times 2 + n_I(Ac) \times 2 + n_{II} + n_{III}]$$

A content of a vinyl ester monomer unit in a vinyl acetal polymer of the present invention is preferably in the range of 0.01 to 20 mol %, more preferably in the range of 0.05 to 15 mol %, further preferably in the range of 0.1 to 10 mol %. Herein, a content of a vinyl ester monomer unit means a proportion of a mole number of a vinyl ester monomer unit to a mole number of all structural units constituting a vinyl acetal polymer (although one acetal unit consisting of two structural units is regarded as two structural units). Herein, for a vinyl acetate unit, a content of a vinyl ester monomer unit is particularly referred to as a "vinyl-acetate-unit content".

A vinyl-acetate-unit content in a vinyl acetal polymer of the present invention is preferably in the range of 0.1 to 50 mol %, more preferably in the range of 1 to 40 mol %, further preferably in the range of 10 to 30 mol %. Herein, a content of a vinyl alcohol unit means a proportion of a mole number of a vinyl alcohol unit to a mole number of all structural units constituting a vinyl acetal polymer (although one acetal unit consisting of two structural units is regarded as two structural units).

A cationic-functional-group content in a vinyl acetal polymer of the present invention varies depending on a process for producing the vinyl acetal polymer. When any of processes (1) and (3) to (6) is employed, it is preferably in the range of 0.01 to 30 mol %, more preferably in the range of 0.05 to 20 mol %, further preferably in the range of 0.1 to 10 mol %. When process (2) is employed, it is preferably in the range of 0.1 to 85 mol %, more preferably in the range of 1 to 83 mol %, further preferably in the range of 10 to 80 mol %. Herein, a cationic-functional-group content means a proportion of a mole number of a cationic functional group to a mole number of all structural units constituting a vinyl acetal polymer (although one acetal unit consisting of two structural units is regarded as two structural units).

Because gel preparation becomes easier, a vinyl acetal polymer of the present invention preferably contains two or more of acetal units free from a cationic functional group, more preferably two or more structural units containing an acetal group represented by Formula (I) wherein $Q_a$ is free from a cationic functional group. Specific examples of such a vinyl acetal polymer include a polymer containing the structural units containing an acetal group represented by Formula (I) including a structural unit where $Q_a$ is a propyl group and a structural unit where $Q_a$ is a methyl group at a molar ratio of the former/the latter=40/60 to 80/20; and a polymer including a structural unit where $Q_a$ is a propyl group and a structural unit where $Q_a$ is a phenyl group at a molar ratio of the former/the latter=40/60 to 80/20.

There are no particular restrictions to an application of a vinyl acetal polymer of the present invention as long as it is used for producing a gel polymer electrolyte composition, but since it provides a gel polymer electrolyte composition which exhibits excellent electrolyte retaining ability, excellent ion conductivity, higher mechanical strength and excellent shape preservation, which does not require an extra step for crosslinking and which can provide a secondary battery with excellent cycle properties, the polymer is preferably used for a gel polymer electrolyte composition containing a vinyl acetal polymer of the present invention and an electrolyte solution wherein a weight ratio of the vinyl acetal polymer to the electrolyte solution is 0.5:99.5 to 9:91. The present invention encompasses such a gel polymer electrolyte composition containing a vinyl acetal polymer of the present invention and an electrolyte solution wherein a weight ratio of the vinyl acetal polymer to the electrolyte solution is 0.5:99.5 to 9:91. In general, the gel polymer electrolyte composition of the present invention is in a so-called "gel state".

An electrolyte solution used for a gel polymer electrolyte composition of the present invention can be a solution containing an electrolyte, preferably containing an electrolyte and a nonaqueous solvent, for example, a solution of an electrolyte in a nonaqueous solvent. The electrolyte solution can further contain a variety of additives as necessary.

The above electrolyte can be a compound capable of generating an ion on being dissolved in a nonaqueous solvent, and examples can include lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$), lithium bis(perfluoroethanesulfonyl)imide ($LiN(SO_2C_2F_5)_2$), tris(trifluoromethanesulfonyl)methyllithium ($LiC(SO_2CF_3)_3$), tris(perfluoroethanesulfonyl)methyllithium ($LiC(SO_2C_2F_5)_3$), lithium tetrachloroaluminate ($LiAlCl_4$) and lithium hexafluorosilicate ($Li_2SiF_6$). The electrolyte can be selected from, besides lithium salts, sodium salts, magnesium salts and calcium salts. These electrolytes can be used alone or in combination of two or more. Among these, lithium salts are preferable and lithium hexafluorophosphate and lithium bis(trifluoromethanesulfonyl)imide are particularly preferable.

Examples of the above nonaqueous solvent include lactones such as γ-butyrolactone, γ-valerolactone, δ-valerolactone and ε-caprolactone; carbonates such as ethylene carbonate, propylene carbonate, butylene carbonate, vinylene carbonate, dimethyl carbonate, ethyl methyl carbonate and diethyl carbonate; ethers such as 1,2-dimethoxyethane, 1-ethoxy-2-methoxyethane, 1,2-diethoxyethane, tetrahydrofuran and 2-methyltetrahydrofuran; nitriles such as acetonitrile; sulforane compounds; phosphoric acids; phosphates; and pyrrolidones. These nonaqueous solvents can be used alone or in combination of two or more. Among these, lactones and carbonates are preferable and γ-butyrolactone, ethylene carbonate, propylene carbonate, dimethyl carbonate, ethyl methyl carbonate and diethyl carbonate are more preferable. When a carbonate is used, it is preferable to combine a cyclic carbonate and a chain carbonate in the light of simultaneous pursuit of promotion of electrolyte dissociation and cation mobility.

In an electrolyte solution contained in a gel polymer electrolyte composition of the present invention, a concentration of an electrolyte is, as an electrolyte solution at 25° C., preferably in the range of 0.01 to 20 mol/L, more preferably in the range of 0.05 to 10 mol/L, further preferably in the range of 0.1 to 5 mol/L.

In a gel polymer electrolyte composition of the present invention, a weight ratio of a vinyl acetal polymer of the present invention to an electrolyte solution is that a vinyl acetal polymer of the present invention:electrolyte solution=0.5:99.5 to 9:91. If a polyvinyl acetal polymer of the present invention is contained in a larger amount beyond this weight ratio, ion conductivity tends to be deteriorated, while if the electrolyte solution is contained in a larger amount, safety tends to be deteriorated due to leakage of liquid. This weight ratio of a vinyl acetal polymer of the present invention: an electrolyte solution is preferably 1:99 to 8:92, more preferably 3:97 to 6:94 in the light of ion conductivity, electrolyte retaining ability and so on. A weight of a vinyl acetal polymer in the above weight ratio does not involve a weight of a counter anion to a cationic functional group contained in the vinyl acetal polymer.

A gel polymer electrolyte composition of the present invention exhibits excellent mechanical strength and excellent shape preservation, dispensing with an extra process for crosslinking, and is, therefore, preferably produced without a crosslinking process, but depending on an application, a gel polymer electrolyte composition of the present invention can be produced through a crosslinking process using a crosslinking promoter.

A gel polymer electrolyte composition of the present invention can just consist of a vinyl acetal polymer of the present invention and an electrolyte solution, but can further contain other components. Examples of such other components include a filler, a crosslinking promoter as described above and a reaction product thereof. A proportion of a vinyl acetal polymer of the present invention and an electrolyte solution in a gel polymer electrolyte composition of the present invention is preferably 50% by weight or more, more preferably 80% by weight or more, further preferably 95% by weight or more.

A gel polymer electrolyte composition of the present invention can be produced, for example, by mixing a vinyl acetal polymer of the present invention with an electrolyte solution at a ratio of 0.5:99.5 to 9:91 as a pre-mixing weight ratio, or alternatively, by impregnating a vinyl acetal polymer of the present invention with an electrolyte solution at a ratio of a weight of the vinyl acetal polymer:a weight of the electrolyte solution=0.5:99.5 to 9:91 as a pre-impregnating weight ratio. Of these, the process involving mixing a vinyl acetal polymer of the present invention with an electrolyte solution is preferable because a more homogeneous gel polymer electrolyte composition can be obtained. As examples of specific methods for producing a gel polymer electrolyte composition of the present invention and for producing a shaped article therefrom, first to third methods will be described below.

The first method is a process where a solution of a vinyl acetal polymer of the present invention in an organic solvent is mixed with an electrolyte solution by, for example, adding the above electrolyte solution to a solution of a vinyl acetal polymer of the present invention in an organic solvent and then the organic solvent is removed by evaporation before or after shaping. There are no particular restrictions to an organic solvent as long as a vinyl acetal polymer of the present invention can be dissolved in it; examples include alcohols such as methanol, ethanol and propanol; ketones such as acetone, methyl ethyl ketone and cyclohexanone; amides such as N,N-dimethylacetamide and N,N-dimethylformamide; ethers such as dioxane and tetrahydrofuran; chlorinated hydrocarbons such as methylene chloride and chloroform; aromatic hydrocarbons such as toluene, xylenes, styrene and pyridine; sulfoxides such as dimethyl sulfoxide; and carboxylic acids such as acetic acid.

The second method is a process where a mixture of a vinyl acetal polymer of the present invention and an electrolyte solution is shaped into a predetermined shape, for example without an organic solvent as described for the first method.

The third method is a process where a vinyl acetal polymer of the present invention is deposited by, for example, cast deposition, melt extrusion deposition or the like to form a film, which is then impregnated with the above electrolyte solution.

Because the above vinyl acetal polymer having a cationic functional group of the present invention is involved, a gel polymer electrolyte composition of the present invention can exhibit excellent electrolyte retaining ability without an extra step for crosslinking and a cationic functional group in a molecular chain could promote ionization of an electrolyte to improve ion conductivity. Furthermore, it is assumed that since a cationic functional group in a molecular chain can efficiently trap anions contained in an electrolyte to improve a transport number of cations, a secondary battery produced using a gel polymer electrolyte composition of the present invention can improve cycle properties.

There are no particular restrictions to applications of a gel polymer electrolyte composition of the present invention, and a gel polymer electrolyte composition of the present invention is preferably used as a constituting member for a battery or capacitor because its excellent properties such as electrolyte retaining ability, ion conductivity, mechanical strength and shape preservation can be effectively utilized. In particular, because excellent cycle properties can be attained, it is more preferably used as a constituting member for a secondary battery or capacitor, further preferably as a constituting member for a lithium ion secondary battery or lithium ion capacitor, particularly preferably as a constituting member for a lithium ion secondary battery.

A secondary battery involving a gel polymer electrolyte generally has a pair of electrodes, a separator, and a gel polymer electrolyte placed between each electrode and the separator. A gel polymer electrolyte composition of the present invention can be used as a gel polymer electrolyte for the secondary battery. A shape of a gel polymer electrolyte composition of the present invention in a secondary battery depends on a shape of a secondary battery to be produced, a production process therefor and so on, and can be, for example, a thin film with a thickness of 1 to 500 µm, or a shape formed by filling spaces in a pair of electrodes, a separator disposed between them and the regions surrounding the spaces with a melted gel polymer electrolyte in a continuous manner and then solidifying the electrolyte.

A cathode as one of a pair of electrodes described above can have a structure where a cathode active material layer is formed on a cathode collector, while an anode as the other electrode can have a structure where an anode active material layer is formed on an anode collector. A secondary battery involving a gel polymer electrolyte preferably has an exterior member. By covering the electrode, the separator and the gel polymer electrolyte as a whole by an exterior member, the secondary battery can be protected.

A cathode collector can be, for example, a plate or foil made of a material such as aluminum, nickel and stainless steel, preferably an aluminum foil.

A cathode active material layer can contain, for example, a cathode active material and binder, and as necessary, further contain a conductive agent.

A cathode active material contained in a cathode active material layer can be a material which can store and release lithium; examples can include lithium-containing transition metal oxides and lithium-containing transition metal phosphate compounds, specifically $LiCoO_2$, $LiNiO_2$, $LiMn_2O_4$, $LiNi_{0.5}Co_{0.5}O_2$, $LiNi_{0.5}Co_{0.3}Mn_{0.2}O_2$, $LiFePO_4$ and $LiFe_{0.5}Mn_{0.5}PO_4$.

A binder contained in a cathode active material layer can be, for example, polyvinylidene fluoride (PVdF).

Examples of a conductive agent contained in a cathode active material layer include Ketjen black, acetylene black, carbon black and carbon nanotube.

A cathode can be produced, for example, by dispersing a cathode active material and a binder, as necessary, together with an electric conduction aid in a solvent such as N-methyl-2-pyrrolidone and kneading the mixture, which is then applied on a cathode collector and then removing the solvent by drying. A cathode active material layer can be formed on one or both sides of a cathode collector.

Examples of an anode collector can be a plate or foil made of a material such as copper, nickel and stainless steel, preferably a copper foil.

An anode active material layer contains, for example, an anode active material and a binder, and can further contain, as necessary, an electric conduction aid.

An anode active material contained in an anode active material layer can be a substance which can store and release lithium; for example, lithium metal; carbon materials such as natural graphite, artificial graphite, mesocarbon microbead (MCMB) and hard carbon; metal oxides such as iron oxides, ruthenium oxide, molybdenum oxide and tungsten oxide; polymer materials such as polyacetylene and polypyrrole; metal or metalloid capable of forming an alloy with lithium and alloys and compounds thereof.

Examples of a metal or metalloid capable of forming an alloy with lithium described above include magnesium, boron, arsenic, aluminum, gallium, indium, silicon, germanium, tin, lead, antimony, bismuth, cadmium, silver, zinc, hafnium, zirconium, yttrium, palladium and platinum. Examples of an alloy or compound of a metal or metalloid capable of forming an alloy with lithium described above include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, SiO, $SiO_2$, SnO, $SnO_2$, $SnSiO_3$, LiSiO and LiSnO.

A secondary battery involving a gel polymer electrolyte composition has an advantage that lithium metal with a large capacity can be used for an anode. When lithium metal is used as an anode active material, a battery capacity of a secondary battery can be dramatically improved, compared to the case that a carbon material such as graphite powder is used.

An anode active material can be used as a powder, a film or sheet or a thin film formed on an anode collector; preferably a powder.

Examples of a binder contained in an anode active material layer include polyvinylidene fluoride (PVdF), styrene-butadiene rubber (SBR) and derivatives thereof.

Examples of an electric conduction aid contained in an anode active material layer include Ketjen black, acetylene black, carbon black and carbon nanotube.

An anode can be produced, for example, by dispersing an anode active material and a binder, as necessary, together with an electric conduction aid in a solvent and kneading the mixture, which is then applied on an anode collector and then removing the solvent by drying. An anode active material layer can be formed on one or both sides of an anode collector.

Examples of the above separator include a porous body such as a microporous film or unwoven fabric formed from a synthetic resin including polyolefins such as polyethylene and polypropylene; fluororesins such as polytetrafluoroethylene (PTFE); and porous vinylon; and a ceramic unwoven fabric. The separator can have a single layer structure or a laminated structure where two or more porous bodies are laminated.

Examples of the above exterior member include a cylindrical or rectangular metal can made of nickel or stainless steel, and an aluminum laminated film. In particular, an aluminum laminated film as an exterior member allows for freely designing a shape of a secondary battery, providing a secondary battery which is more lightweight than that provided using a metal can as an exterior member. By using a gel polymer electrolyte composition of the present invention, a safer secondary battery can be provided, which can be free from leakage of liquid, a problem in a secondary battery produced using an aluminum laminated film as an exterior member and only an electrolyte solution without a polymer.

There are no particular restrictions to a process for producing a secondary battery, and it can be produced, for example, by placing a pair of electrodes and a separator disposed between the electrodes in the interior of a bag as an exterior member, pouring a melted gel polymer electrolyte composition of the present invention and solidifying the composition by cooling.

EXAMPLES

There will be further detailed the present invention with reference to Examples, but the present invention is not limited to these examples in any manner.

Production Example 1

Production of a Cation-Modified Polyvinyl Butyral (Polymer A)

In a flask equipped with a stirrer, a thermometer, a dropping funnel and a reflux condenser were charged 2500 g (29 mol) of vinyl acetate, 697 g of methanol and 4.5 g (0.020 mol) of (3-methacrylamidepropyl)trimethylammonium chloride. Then, while the flask was placed in a thermostatic bath, the atmosphere of the system was replaced by nitrogen and an internal temperature was increased to 60° C. Subsequently, 3.5 g (0.021 mol) of 2,2'-azobisisobutyronitrile was added together with 50 g of methanol to initiate polymerization. During the polymerization for 3 hours, 340 g of a 50 wt % solution of (3-methacrylamidepropyl)trimethylammonium chloride in methanol (containing 0.77 mol of (3-methacrylamidepropyl)trimethylammonium chloride) was added dropwise at a constant rate. When the polymerization was terminated, a solid concentration in the system was 49.8% by weight.

A gas inlet tube and a vacuum distillation device were mounted on the flask, and the unreacted vinyl acetate monomer was expelled by introducing methanol vapor into the polymerization liquid under a reduced pressure to give a 44.3 wt % solution of a copolymer in methanol.

While 812 g of the above copolymer solution in methanol was stirred at 35° C., 42.1 mL of a 2 mol/L solution of sodium hydroxide in methanol was added and the mixture was thoroughly mixed and then allowed to stand. After 7 min and 20 sec, the whole system had gelated. After further 20 min, the gel was pulverized by a pulverizer, washed with methanol and then dried by heating to give a cation-polymerization-modified polyvinyl alcohol (polymer P).

The polymer P thus obtained contained 4 mol % of a structural unit derived from (3-methacrylamidepropyl)trimethylammonium chloride, 1 mol % of a vinyl acetate unit and 95 mol % of a vinyl alcohol unit. A Brookfield viscosity of a 4% aqueous solution at 20° C. was 34.1 centipoise.

In a two liter glass vessel equipped with a reflux condenser, a thermometer and an anchor type stirring blade was charged 1350 g of ion-exchange water and 110 g of polymer P, and the mixture was stirred at 120 rpm and 95° C. for 60 min to completely dissolve polymer P (a concentration of polymer P: 7.5% by weight). This aqueous solution was gradually cooled to 10° C. over about 30 min with stirring at 120 rpm. Then, 75 g of n-butylaldehyde (1.0 mol) and 131 mL of 20% by weight hydrochloric acid were added and an acetalization reaction was conducted for 25 min. Subsequently, the mixture was warmed to 45° C. over 150 min, kept at the temperature for 240 min and then cooled to room temperature. A precipitated resin was washed with ion-exchange water, neutralized by adding an aqueous solution of sodium hydroxide, again washed with ion-exchange water and dried to give a cation-modified polyvinyl butyral (polymer A).

In polymer A thus obtained, a degree of butyralization was 78 mol %, a vinyl-acetate unit content was 1 mol %, a vinyl-alcohol unit content was 17 mol %, and a cation-modified unit content was 4 mol % (a cationic-functional-group content: 4 mol %).

Production Example 2

Production of a Cation-Modified Polyvinyl Acetal (Polymer B)

A cation-modified polyvinyl acetal (polymer B) was produced as described in Production Example 1, substituting a mixture of 37 g of n-butylaldehyde (0.51 mol) and 23 g of acetaldehyde (0.52 mol) for 75 g of n-butylaldehyde (1.0 mol).

In polymer B thus obtained, a degree of butyralization was 39 mol %, a degree of acetoacetalization was 39 mol %, a vinyl-acetate unit content was 1 mol %, a vinyl-alcohol unit content was 17 mol %, and a cation-modified unit content was 4 mol % (a cationic-functional-group content: 4 mol %).

Production Example 3

Production of a Cation-Modified Polyvinyl Acetal (Polymer C)

A cation-modified polyvinyl acetal (polymer C) was produced as described in Production Example 1, substituting 110 g of a polyvinyl alcohol ("Poval" PVA-117 from Kuraray Co., Ltd.) for 110 g of polymer P and substituting a mixture of 37 g of n-butylaldehyde (0.51 mol) and 163 g of 3-(2,2-dimethoxyethyl)-1-methyl-1H-imidazol-3-ium hexafluorophosphate (0.52 mol) for 75 g of n-butylaldehyde (1.0 mol).

In polymer C thus obtained, a degree of butyralization was 39 mol %, a vinyl-acetate unit content was 1 mol %, a vinyl-alcohol unit content was 21 mol % and a cation-modified unit content was 39 mol % (a cationic-functional-group content: 19.5 mol %).

Production Example 4

Production of a Cation-Modified Polyvinyl Acetal (Polymer D)

A cation-modified polyvinyl acetal (polymer D) was produced as described in Production Example 3, substituting a mixture of 25 g of n-butylaldehyde (0.35 mol), 15 g of acetaldehyde (0.34 mol) and 109 g of 3-(2,2-dimethoxyethyl)-1-methyl-1H-imidazol-3-ium hexafluorophosphate (0.34 mol) for a mixture of 37 g of n-butylaldehyde (0.51 mol) and 163 g of 3-(2,2-dimethoxyethyl)-1-methyl-1H-imidazol-3-ium hexafluorophosphate (0.52 mol).

In polymer D thus obtained, a degree of butyralization was 26 mol %, a degree of acetoacetalization was 26 mol %, a vinyl-acetate unit content was 1 mol %, a vinyl-alcohol unit content was 21 mol % and a cation-modified unit content was 26 mol % (a cationic-functional-group content: 13 mol %).

Production Example 5

Production of an Unmodified Polyvinyl Formal (Polymer Y)

In a two liter glass vessel equipped with a reflux condenser, a thermometer and an anchor type stirring blade was charged 1350 g of ion-exchange water and 110 g of a polyvinyl alcohol ("Poval" PVA-117 from Kuraray Co., Ltd.), and the mixture was stirred at 120 rpm and 95° C. for 60 min to completely dissolve the polyvinyl alcohol (a concentration of the polyvinyl alcohol: 7.5% by weight). This aqueous solution was gradually cooled to 10° C. over about 30 min with stirring at 120 rpm. Then, 84 g of formalin (a 37 wt % aqueous solution of formaldehyde; containing 1.0 mol of formaldehyde) and 131 mL of 20% by weight hydrochloric acid were added and an acetalization reaction was conducted for 25 min. Subsequently, the mixture was warmed to 45° C. over 150 min, kept at the temperature for 240 min and then cooled to room temperature. A precipitated resin was washed with ion-exchange water, neutralized by adding an aqueous solution of sodium hydroxide, again washed with ion-exchange water and dried to give an unmodified polyvinyl formal (polymer Y).

In polymer Y thus obtained, a degree of formalization was 78 mol %, a vinyl-acetate unit content was 1 mol % and a vinyl-alcohol unit content was 21 mol %.

Production Example 6

Production of an Unmodified Polyvinyl Acetal (Polymer Z)

An unmodified polyvinyl acetal (polymer Z) was produced as described in Production Example 5, substituting a mixture of 37 g of n-butylaldehyde (0.51 mol) and 23 g of acetaldehyde (0.52 mol) for 84 g of formalin (a 37 wt % aqueous solution of formaldehyde; containing 1.0 mol of formaldehyde).

In polymer Z thus obtained, a degree of butyralization was 39 mol %, a degree of acetoacetalization was 39 mol %, a vinyl-acetate unit content was 1 mol %, and a vinyl-alcohol unit content was 21 mol %.

Example 1

Five parts by weight of polymer A (although a weight of a counter anion was not included) and 95 parts by weight of ethanol were blended and stirred for one hour to prepare a polymer solution. Separately, a lithium hexafluorophosphate as an electrolyte was dissolved in a nonaqueous solvent prepared by blending ethylene carbonate and ethyl methyl carbonate at a weight ratio of ethylene carbonate:ethyl methyl carbonate=3:7 to a concentration of 1.0 mol/L to prepare an electrolyte solution. Then, 95 parts by weight of the electrolyte solution prepared was mixed with the above polymer solution, and the mixture was thoroughly stirred until a homogeneous solution was obtained, to give a mixed solution. Next, in a "Teflon" tray vessel prepared in advance was poured the whole mixed solution, and the mixture was heated for drying at 50° C. for 5 hours and then dried under a reduced pressure in a vacuum oven at 70° C. for 3 hours for removing ethanol to give a gel polymer electrolyte composition as a thin film with a thickness of about 200 μm which adhered to the "Teflon" vessel.

Example 2

A gel polymer electrolyte composition was produced as described in Example 1, substituting polymer B for polymer A.

Example 3

A gel polymer electrolyte composition was produced as described in Example 1, substituting polymer C for polymer A.

Example 4

A gel polymer electrolyte composition was produced as described in Example 1, substituting polymer ID for polymer A.

Comparative Example 1

A gel polymer electrolyte composition was produced as described in Example 1, substituting polymer Y for polymer A and substituting tetrahydrofuran for ethanol.

Comparative Example 2

A gel polymer electrolyte composition was produced as described in Example 1, substituting a polyvinyl butyral ("Mowital" B60H from Kuraray Europe GmbH; polymer W) for polymer A.

Comparative Example 3

A gel polymer electrolyte composition was produced as described in Example 1, substituting polymer Z for polymer A.

Comparative Example 4

A gel polymer electrolyte composition was produced as described in Example 3, except that the amount of polymer C was 10 parts by weight in place of 5 parts by weight and the amount of the electrolyte solution prepared was 90 parts by weight in place of 95 parts by weight.

Comparative Example 5

A gel polymer electrolyte composition was produced as described in Example 3, except that the amount of polymer C was 0.4 parts by weight in place of 5 parts by weight and the amount of the electrolyte solution prepared was 99.6 parts by weight in place of 95 parts by weight.

The gel polymer electrolyte compositions of Examples 1 to 4 and Comparative Examples 1 to 5 produced as described above were evaluated by the following methods. The results are shown in Table 1.

Leakage of Liquid

After the drying under a reduced pressure in a vacuum oven, a gel polymer electrolyte composition was evaluated as "no leak" when its surface was dry and as "leak" when its surface was wet.

Mechanical Strength

A gel polymer electrolyte composition was evaluated as having "adequate" or "inadequate" mechanical strength when it was unbroken or broken when it was peeled from a "Teflon" vessel, respectively.

Ion Conductivity

A "Teflon" vessel containing a gel polymer electrolyte composition was transferred in a glove box filled with argon gas, and the gel polymer electrolyte composition was peeled from the "Teflon" vessel and cut into a circle with a diameter of 1 cm as a measurement sample piece. This measurement sample was sandwiched between stainless-steel electrodes to give a cell. This cell was connected to an impedance analyzer via a lead, and a resistance of the sample was measured at 20° C. by an alternating-current impedance method. Measurement was conducted under an argon atmosphere and an ion conductivity σ was calculated from a resistance of a measurement sample, its thickness (about 200 µm) and an area of the stainless-steel electrode.

Cycle Properties

A lithium ion secondary battery was produced using an aluminum foil with a thickness of 20 µm as a cathode collector, lithium cobaltate ($LiCoO_2$) as a cathode active material, a microporous polyethylene film with a thickness of 25 µm as a separator, a graphite powder as an anode active material, a copper foil with a thickness of 15 µm as an anode collector, an aluminum laminated film as an exterior member, and a gel polymer electrolyte composition having a similar composition to a gel polymer electrolyte composition in each of Examples and Comparative Examples described above as a gel polymer electrolyte composition.

Using the above lithium ion secondary battery, discharge and charge was conducted for studying cycle properties. Discharge and charge consisting of constant-current/constant-voltage charge at 23° C. and 500 mA to an upper limit of 4.2V for 2 hours and then constant-current discharge at 500 mA to a final voltage of 3.0 V was repeated 100 cycles. Then, cycle properties were evaluated from a discharge capacity retention percentage in the 100th cycle assuming that a discharge capacity in the first cycle was 100%, that is, a value determined by the equation, [a discharge capacity in the 100th cycle in 500 mA discharge]/[a discharge capacity in the first cycle in 500 mA discharge]×100(%).

TABLE 1

| | Evaluation results for a gel polymer electrolyte composition | | | | | |
|---|---|---|---|---|---|---|
| | Type of polymer | Polymer content (*1) | Mechanical strength | Leakage of liquid | Ion conductivity σ (×10⁻³ Scm⁻¹) | Cycle properties (%) |
| Example 1 | A | 5 | Adequate | No leak | 3.8 | 75 |
| Example 2 | B | 5 | Adequate | No leak | 3.9 | 78 |
| Example 3 | C | 5 | Adequate | No leak | 4.3 | 88 |
| Example 4 | D | 5 | Adequate | No leak | 4.3 | 82 |
| Comparative Example 1 | Y | 5 | Inadequate | Leak | 3.3 | 62 |
| Comparative Example 2 | W | 5 | Adequate | No leak | 2.9 | 53 |
| Comparative Example 3 | Z | 5 | Adequate | No leak | 3.2 | 59 |
| Comparative Example 4 | C | 10 | Adequate | No leak | 2.1 | 65 |
| Comparative Example 5 | C | 0.4 | Inadequate | Leak | 3.8 | 67 |

(*1) A content of a vinyl acetal polymer based on 100 parts by weight of a gel polymer electrolyte composition (although a weight of a counter anion is not included) (parts by weight).

As is obvious from the results in Table 1, a vinyl acetal polymer which has a cationic functional group (Examples 1 to 4) exhibits a high ion conductivity. This is probably because a cationic functional group in a vinyl acetal polymer promotes ionization of an electrolyte in an electrolyte solution. A vinyl acetal polymer, which has a cationic functional group (Examples 1 to 4) provides a secondary battery exhibiting excellent cycle properties. This is probably because a cationic functional group in a vinyl acetal polymer causes efficient trapping of anions contained in an electrolyte solution.

In contrast, when a weight ratio of a vinyl acetal polymer to an electrolyte solution in a gel polymer electrolyte composition is the same, but a vinyl acetal polymer does not have a cationic functional group (Comparative Example 1 to 3), then an ion conductivity is lower and cycle properties of a secondary battery are inferior. Furthermore, when an unmodified polyvinyl formal is used (Comparative Example 1), a gel polymer electrolyte composition may exhibit inadequate strength and leakage of liquid may occur, indicating that when it is used as a gel polymer electrolyte in a lithium ion secondary battery, it is difficult to ensure adequate safety. Furthermore, when a vinyl acetal polymer has a cationic functional group but a weight ratio of a vinyl acetal polymer to an electrolyte solution in a gel polymer electrolyte composition is high (Comparative Example 4), then a weight proportion of the electrolyte solution is low, leading to a lower ion conductivity. To the contrary, when a weight ratio of a vinyl acetal polymer to an electrolyte solution in a gel polymer electrolyte composition is low (Comparative Example 5), then the gel polymer electrolyte composition has inadequate strength and leakage of liquid may occur.

INDUSTRIAL USABILITY

A gel polymer electrolyte composition of the present invention can be suitably used for a gel polymer electrolyte in a battery or capacitor. When the composition is used as a gel polymer electrolyte in a battery, particularly a secondary battery, especially a lithium ion secondary battery, the battery exhibits improved electric load properties due to excellent ion conductivity and excellent repeated charge/discharge properties (cycle properties) due to inhibition of increase in a battery internal resistance by efficient trapping of anions. Furthermore, a gel polymer electrolyte composition of the present invention can be used for a secondary battery using sodium, magnesium or calcium ions besides lithium ions as a charge transporter.

The invention claimed is:

1. A gel polymer electrolyte composition, comprising:
   a vinyl acetal polymer comprising a cationic functional group; and
   an electrolyte solution comprising an electrolyte and a nonaqueous solvent,
   wherein a weight ratio of the vinyl acetal polymer to the electrolyte solution is from 0.5:99.5 to 9:91.
2. The gel polymer electrolyte composition of claim 1, wherein said cationic functional group is a quaternary ammonium group.
3. The gel polymer electrolyte composition of claim 1, wherein said cationic functional group is an imidazolium group.
4. The gel polymer electrolyte composition of claim 1, wherein said cationic functional group is a pyridinium group.
5. The gel polymer electrolyte composition of claim 1, wherein said cationic functional group is a phosphonium group.
6. The gel polymer electrolyte composition of claim 1, wherein said cationic functional group is a sulfonium group.
7. A process for producing a gel polymer electrolyte composition, the process comprising:
   mixing a vinyl acetal polymer comprising a cationic functional group and an electrolyte solution comprising an electrolyte and a nonaqueous solvent, at a ratio of 0.5:99.5 to 9:91.

* * * * *